Patented Mar. 12, 1940

2,193,391

UNITED STATES PATENT OFFICE 2,193,391

METHOD OF MAKING PLASTIC HYDRAULIC LIMES

William E. Carson, Riverton, Va.

No Drawing. Application July 7, 1936,
Serial No. 89,467

3 Claims. (Cl. 106—24)

This invention relates to methods of making plastic hydraulic limes; and it comprises a method of making improved hydraulic limes wherein hydraulic lime is fine ground to 100 mesh or finer and the contained free lime is hydrated with the aid of an aqueous milk or cream of lime containing lime of colloidal fineness, the amount of the admixture sufficing to hydrate the free lime of the hydraulic lime and to hold the temperature below the boiling point of water, the mixture after effecting hydration being fine ground to 100 mesh fineness or finer; all as more fully hereinafter set forth and as claimed.

Hydraulic lime is the name given certain limes made by burning siliceous limestones and differing from ordinary quicklime in that when made up with water they slake and gradually harden to a compact mass which attains maximum hardness in water. Since they are self-slaking pulverization has always been regarded as unnecessary and in the old art of making concrete which antedated the introduction of Portland cement and natural cement, lump hydraulic lime, aggregate and water were simply mixed in a mortar box. Excellent concretes could be made but more skill was required than is the case with Portland or natural cements. These concretes however have certain advantages over more modern types.

Quicklime and hydraulic lime differ in that the former is tolerably pure CaO, with or without some MgO, while the latter is a physical mixture of CaO and reactive siliceous material; mostly clayey silicates and silica. In a general way the actions when hydraulic lime is made up with water can be regarded as successive hydration of the CaO, an attack on the silicates by the moist hydrate to form new complex bodies rich in CaO and a final crystallization with the aid of the water. Within rather wide ranges in the silica content the mass will set up as a whole.

In making quicklime, limestones carrying more clay or siliceous matter than corresponds to about 3 per cent of silica are not desirable, while in making hydraulic lime, a high content of silica and silicates is necessary. A content of silica and silicates corresponding to a silica range between 12 and 20 per cent $SiO_2$ gives good hydraulic limes. Massive limestones having compositions within the proper range are not common, but in practice material from different seams of a given quarry can usually be blended to come within this range and gives a satisfactory hydraulic lime. This blending practice is particularly advantageous in the present invention, in which fine grinding forms one step, since fine materials can be readily mixed to standardized compositions. Addition of correctives to control the time of set, in small amount, is also feasible.

In the use of hydraulic lime in the usual way, which includes mixing with enough water to make a mortar, the three successive reactions of slaking, chemical action and setting overlap in time. Some of the lime hydrates before the rest and chemical actions then begin. The use of hydraulic lime, therefore, as stated, requires expert skill and the results are not always satisfactory.

As I have found, the necessity for expert skill in making concrete with hydraulic lime is obviated and more satsifactory and uniform results secured by using the lime as a specially made hydrated dry powder instead of putting it into a mortar box in lump form. More intimate and uniform commixture is possible and, hydration having already been effected, the whole operation becomes simpler. In a prior and copending application Serial No. 617,060, filed June 13, 1932, I have described and claimed a method of making such a material wherein hydraulic lime is ground to an extremely fine dry powder and this hydrated with a limited amount of water; the amount being merely enough to effect hydration of the CaO without forming a moist magma to attack the silicates. As I have found, in order to make a completely satisfactory product after this hydration, which results in a mixture of hydrated CaO and unattacked silicates, it is necessary to re-grind the material. This re-grinding adds to the expense, but the avantages secured offset this.

In the method of the copending application hydration is effected in a manner similar to the method used with quicklime in my prior Patent No. 1,613,341, though the reasons are somewhat different. In both cases the lime is reduced to extreme fineness prior to hydration; being ground so that 95 per cent goes through a 100 mesh screen. The products, however, are wholly different; the product of the patent being a hydrated quicklime which with water forms a buttery plastic mass, while the product of the copending application sets up with water in a way analogous to the behavior of Portland cement.

In making a dry, partially hydrated hydraulic lime of a type which has now gone into extensive commercial use, limestones from various seams of a quarry are mixed so as to give a material carry'ng between 12 and 20 per cent silica. The rock is burnt in the usual way. The burnt material is ground to an extreme fineness, so that 95 per cent goes through a 100 mesh sieve. To the ground product I add just enough water to hydrate the lime, allowing a little excess for the formation of steam. To this water there is added about 1.5 per cent of sulfuric acid as a corrective agent. The acid ultimately forms calcium sulphate which is a constituent of the finished material. The temperature rise in the operation is not excessive due to the fine grinding of the burnt rock. There is no liquid water present for a time long enough to allow reaction with the silicates. The product thus obtained, I place in a bin and allow it to age for 24 hours, thereby homogenizing the product. I then grind it again to about the initial fineness. I find that this second grinding gives a product having a better strength in the final concrete. In this particular instance, I add 0.5 per cent of commercial stearic acid, as a waterproofing agent, to the mixture just before the second grinding.

The exact fineness of the preliminary grinding necessary to attain the desired complete hydration of the lime (and magnesia) without hydration of the siliceous material varies somewhat with the character of the lime. With a porous, open-textured powder such as can be produced from particular lime rocks, or can be made by particular methods of calcination, somewhat coarser material is possible, without setting up a rhythmic hydration with temporary presence of free water. On the other hand, with some limes I find that it is desirable to grind to 200 mesh. The particular fineness advantageous in any case, using any given lime, can be readily determined, as set forth in my prior Patent No. 1,613,341, by what may be termed a laboratory duplication of plant procedure.

A sample of fine ground hydraulic lime is mixed with the right amount of water in a roomy beaker shielded against cooling. If the hydraulic lime is sufficiently fine, a quiet, but good reaction will take place after an incubation period of perhaps a minute, the whole mass changing to a dry, fine-powdered body consisting of a fine mixture of completely hydrated dry lime particles and unattacked particles of siliceous matter. I find that ordinarily, as in the prior patent, I require about 72.4 parts of water at the ordinary temperature for each 100 parts of actual CaO (and MgO) in the hydraulic lime.

Various changes may be made in the procedure outlined. The proportions of water used in hydration can be varied to some extent depending upon the conditions of mixing, etc. In some cases the ratio of water to lime present may be as low as 0.5:1, for example. A waterproofing agent such as stearic acid or soap can be added to the product in quantities ranging from about 0.1 to 1.0 per cent by weight. Corrective agents such as gypsum, calcium chloride, sulphuric acid or hydrochloric acid may be added. From 1 to 2½ per cent by weight of sulphuric acid based on the product is advantageous, for example. The temperature of the hydrating mix may vary considerably with conditions. It is always desirable to mix in such fashion that complete wetting occurs before any substantial hydration takes place. If carried out in this manner the mass merely steams a little and does not go about 105° C. and usually not above 101° C. The product obtained, after 24 hours homogenization of the hydrated mixture and a finishing grinding, is perfectly dry and of extreme fineness and plasticity. Materials made under the stated invention may be shipped and stored indefinitely. On adding water in making mortar, there is no hydration of the lime to complicate reaction of the hydrated lime and silicates with resultant flash-setting. Without much skill, a mortar can be made which sets up regularly to a hard, permanent, water-resistant mass. In making concrete, the aggregate can be mixed with the hydraulic lime and then water applied.

For some reason, this type of hydrated hydraulic lime forms an excellent addition to ordinary Portland cement in making ordinary concrete, noticeably increasing the strength and density of the concrete. In plastering, the blended lime silicates and hydrated lime give a quick-setting hard plaster with sound deadening characteristics. In masonary the mortar is ideal as it combines plasticity, workability and early set with ultimate strength.

It has been found in practice that admixture of short-slaked hydraulic lime of the type described is advantageous not only with cement but with other calcareous mortars. The hydrauic lime will tolerate an addition of more lime without forfeiting the property of setting up as a whole; the proportion of silicates present being more than is required by the free lime of the hydraulic lime.

In the present invention I take advantage of this fact and add a certain amount of lime of colloid fineness. This has the further advantage that the mixture makes a more plastic mortar; it works more readily under the trowel.

Plasticity in lime is the property of forming a completely plastic mass when made up with water; a buttery or creamy mass free of grains. There is sufficient free lime in hydraulic lime to give a plastic product when this lime is hydrated under the conditions stated.

Lump lime when slaked under mortar box conditions, that is to say with plenty of water and time to complete the actions, will give a buttery hydrate containing lime of colloid fineness provided the temperature does not go too high, say above 180° F.

In the present invention instead of hydrating the free lime of hydraulic lime with water, as is done in the acknowledged copending application, I mix with the fine ground hydraulic lime enough cool fully slaked lime as a cream or milk to furnish the amount of water necessary. The milk of lime is mixed with the hydraulic lime which has been ground to exceeding fineness, using an ordinary mixer. With proper proportioning, a dry mass is obtained. Ordinarily I somewhat further dry it. The dry material is then fine ground.

While the hydraulic lime of my copending application is plastic and can readily be used for plasters and finishes, it is given an additional plasticity by the present invention which is worth while. The lime of colloid fineness added to the hydraulic lime gives more plasticity; it gives a material which is better for troweling. And in making concrete it gives a better union with the aggregate.

In practical embodiments of the present invention, lump hydraulic lime as it comes from the kiln, after cooling and sorting out unburned lumps, is ground to an extreme fineness, 100 mesh or finer, and is run into a storage bin. Ordinary non-hydraulic quicklime is slaked in lumps with an excess of water to form a milk of lime containing $Ca(OH)_2$ of colloid fineness, the excess of water keeping the temperature of slacking below the boiling point. After screening out foreign matter the milk of lime is run to a plurality of storage and dewatering tanks where the milk of lime is allowed to settle to a gel-like sludge and superposed clear water is removed. It can be reused if desired. Pulverized hydraulic lime is run from its storage into a mixer and to it is added sufficient of the cream or gel-like sludge of hydrated lime to slake the free lime of the powdered hydraulic lime and to form a substantially dry mixture. The dry mixture is run from the mixer into a reaction chamber and is allowed to stand to complete the hydration of the free lime and to undergo the desired aging actions. In the formation of the dry mixture, as I have found, there occurs substantially no attack on the silicates present in the hydraulic lime. The dry mixture can be run from the reaction chamber ("hydrater") onto a belt conveyor where it is cooled and further dried and thence to a pulverizing mill where the mixture is fine ground. A fineness of 100-200 mesh is advantageous. From the pulverizer of the fine re-ground plastic hydrated hydraulic lime may be run to a bagging machine where it is packed for shipment and use.

The apparatus used in making the new plastic hydraulic lime is quite similar to that described in my application Serial No. 89,415, filed July 7, 1936, entitled Making plastic lime.

As stated, it is important to keep the temperature during the hydration of lime down to 180° F. or less both in slaking the quicklime and in the slaking of the ground hydraulic lime with the milk of lime. The cool lime hydrate of the milk of lime absorbs heat generated in the slaking of the hydraulic lime, having the effect of reducing the temperature during the hydration. This is advantageous.

What I claim is:

1. A process of making a plastic dry hydraulic lime preparation in pulverulent form which comprises powdering hydraulic burned lime, slaking the free lime therein by mixing the powdered hydraulic lime with aqueous milk of colloidal lime formed by slaking quicklime at relatively low temperatures and in sufficient quantity to hydrate the free lime of the hydraulic lime at a temperature below the boiling point of water and to form a dry mixture and fine grinding the dry mixture.

2. A process of making a plastic hydraulic lime which comprises slaking quicklime in lumps as it comes from the kiln in an excess of water sufficient to hold the temperature below 180° F., and forming milk of lime containing lime hydrate of colloidal fineness, removing water from the milk, fine grinding lump hydraulic lime, mixing therewith sufficient of said milk of lime to hydrate the free lime of the hydraulic lime and to keep the temperature below 180° F. so as to form a dry solid mixture and fine grinding the mixture.

3. Slaking ground hydraulic lime by admixing therewith sufficient aqueous milk of low temperature colloidal lime to hydrate the free lime of the hydraulic lime, thereby forming a dry mixture and keeping the temperature below the boiling point of water during the hydration.

WILLIAM E. CARSON.